United States Patent [19]
Kefalas

[11] 3,711,838

[45] Jan. 16, 1973

[54] MAGNETIC DEVICE FOR DOMAIN WALL PROPAGATION

[75] Inventor: John H. Kefalas, Billerica, Mass.

[73] Assignee: Honeywell Information Systems Inc., Waltham, Mass.

[22] Filed: Feb. 1, 1971

[21] Appl. No.: 111,338

[52] U.S. Cl. ..........................340/174 TF, 340/174 M

[51] Int. Cl. ............................G11c 11/14, G11c 5/02

[58] Field of Search .................................340/174 TF

[56] References Cited

UNITED STATES PATENTS

| | | | |
|---|---|---|---|
| 3,599,190 | 8/1971 | Smith | 340/174 TF |
| 3,648,260 | 3/1972 | Gyorgy et al. | 340/174 TF |

*Primary Examiner*—James W. Moffitt

*Attorney*—Ronald T. Reiling and Fred Jacob

[57] ABSTRACT

Magnetic planar modules have cylindrical domains magnetized normal to the planar surfaces of the modules and are propagated by the introduction of a rotating field transverse the domains in the selected ones of the modules. The magnetic surface of the modules may be of a cobalt-phosphorus alloy which supports cylindrical domains and allows for an economical and large scale production of an array of magnetic modules. The domains are guided throughout their respective modules to predetermined locations where their presence or absence is detected.

12 Claims, 2 Drawing Figures

PATENTED JAN 16 1973 3,711,838

INVENTOR.
JOHN H. KEFALAS
BY
ATTORNEY

MAGNETIC DEVICE FOR DOMAIN WALL PROPAGATION

BACKGROUND OF THE INVENTION

The invention relates to an arrangement which has application in the field of data processing and more particularly to such arrangements which employ magnetic media in which single wall domains can be propagated.

A single wall domain is a magnetic domain bounded by a domain wall which closes on itself and has a geometry independent of the boundary of the sheet in the plane in which it is moved. The domain assumes the shape of a cylinder in the plane of the sheet and has a stable diameter determined by the parameters of the sheet material.

The movement of domains is normally done by generating localized fields within the sheet of a polarity to attract domains. By offsetting such fields consecutively, a domain follows the attractive fields from input to output positions in the sheet. A material which is well known to the art for its ability to support single wall domains is a rare earth orthoferrite. These materials have preferred directions of magnetization substantially normal to the plane of the sheet. If an orthoferrite sheet is saturated magnetically in a negative direction along an axis normal to the plane of the sheet, then the magnetization of a single wall domain is in the positive direction along the axis. Other single crystal magnetic materials may be used as single wall domain carriers so long as the magnetic material is anisotropic along the axis normal to the plane of the sheet.

While crystal magnetic material has made possible an entirely new family of devices for performing digital operations of memory, logic, and switching, a difficulty exists in that crystals of this type cannot as yet be grown to a sufficient size for commercial applications.

An object of the present invention is to provide a single wall domain propagation device in which a plurality of magnetic sheets capable of supporting cylindrical domains are combined to form a magnetic plane of sufficient dimension for commercial use.

Another object of the present invention is to provide a single wall domain propagation device in which the magnetic plane is of a magnetic material which lends itself to large scale plane fabrication.

Yet another object of the present invention is to provide a modularized single wall domain propagation device which may serve as a computer memory with a significantly decreased access time.

It is also an object of the present invention to provide a method of fabrication of a computer memory which insures ease and low cost of manufacture, efficiency of memory packaging, and a high density bit storage.

Other objects of the invention will be evident from the description hereinafter presented.

SUMMARY OF THE INVENTION

The invention provides for a magnetic plane which is capable of supporting cylindrical domains which are magnetized normal to the broad surfaces of the plane. A rotating field is provided within the plane such that the filed is transverse the cylindrical domains. The domains are propagated throughout the magnetic plane by the presence of the rotating field and are guided to predetermined locations where their presence is detected.

Another feature of the invention is that the magnetic plane is modularized in that it comprises a plurality of modules which independently support cylindrical domains. These modules may be arranged in a matrix array of columns and rows. Pairs of coils surround each of the modules. One of the coils of each pair are associated with column modules, while the other coils of each pair are associated with the row modules. Signal or current sources are coupled with the coils of each column; and signal or current sources are coupled with the coils of each row. The selection of a column-associated-current source and a row-associated-current source provides a rotating field at a resulting selected one of the magnetic modules.

Still another feature of the invention is to provide a magnetic plane of a cobalt-phosphorus alloy which is capable of supporting cylindrical domains which are magnetized normal to the broad surfaces of the plane.

Yet another feature of the invention is to provide an overlay on the magnetic material which is responsive to the rotating field for guiding the domains throughout the magnetic plane. The overlay material may be of magnetically soft material in which moving pole concentrations are generated in response to the rotating field in order to attract and advance these cylindrical domains.

Another feature of the invention is that the cylindrical domains are detected at predetermined locations by sensors which are fewer in number than the plurality of modules which comprise the magnetic plane.

These and other features which are considered to be characteristic of this invention are set forth with particularity in the appended claims. The invention itself, however, as well as additional objects and features thereof, will best be understood from the following description when considered in conjunction with the accompanying drawings.

DESCRIPTION OF THE PREFERRED EMBODIMENT

Figure 1:
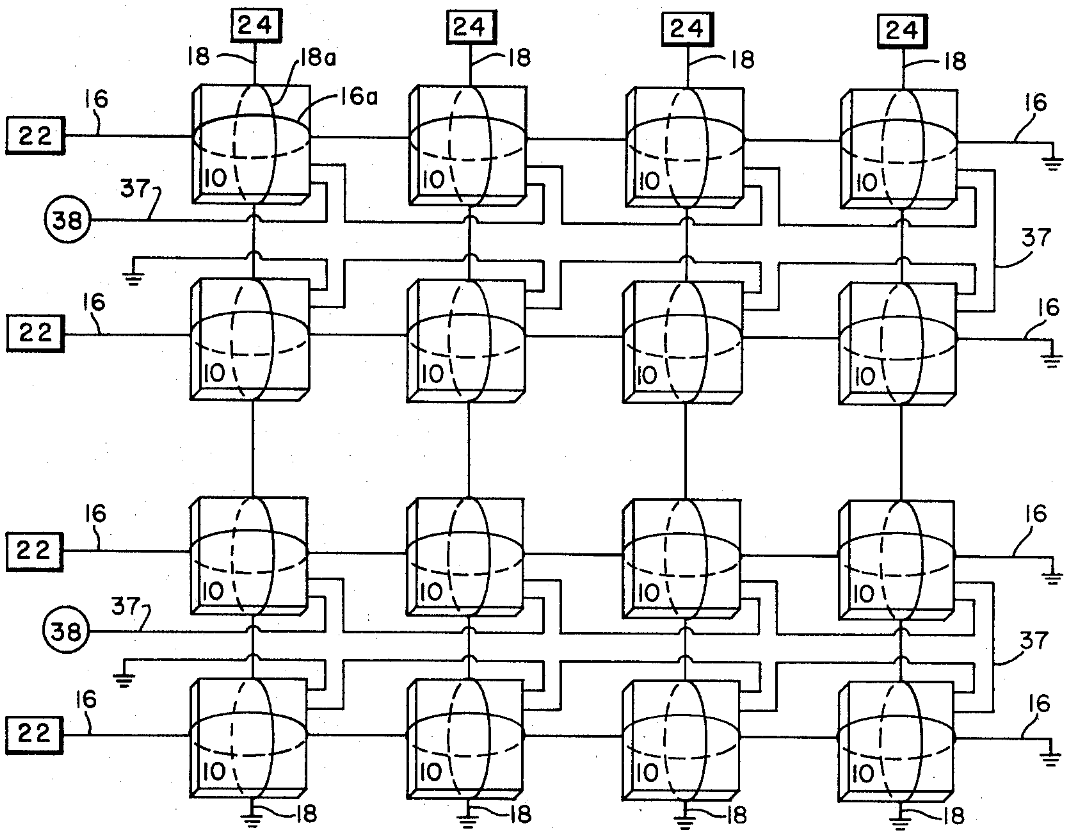
FIG. 1 is a schematic of a modular array for the propagation of single wall domains and embodies features of the invention.

In FIG. 1 there is shown a domain propagation arrangement which serves as a data storage device. A matrix array of magnetic modules 10 are arranged in rows and columns. Associated with each row of modules 10, are conductors 16 which have coil portions 16a surrounding each of the modules 10 in a given row. Conductors 18 are associated with each module 10 of a given column. Conductors 18 have coil portions 18a which surround the respective modules 10 in each column. Conductors 16 are connected between signal or current sources 22 and a ground potential. Conductors 18 are connected between current or signal sources 24 and a ground potential.

Figure 2:
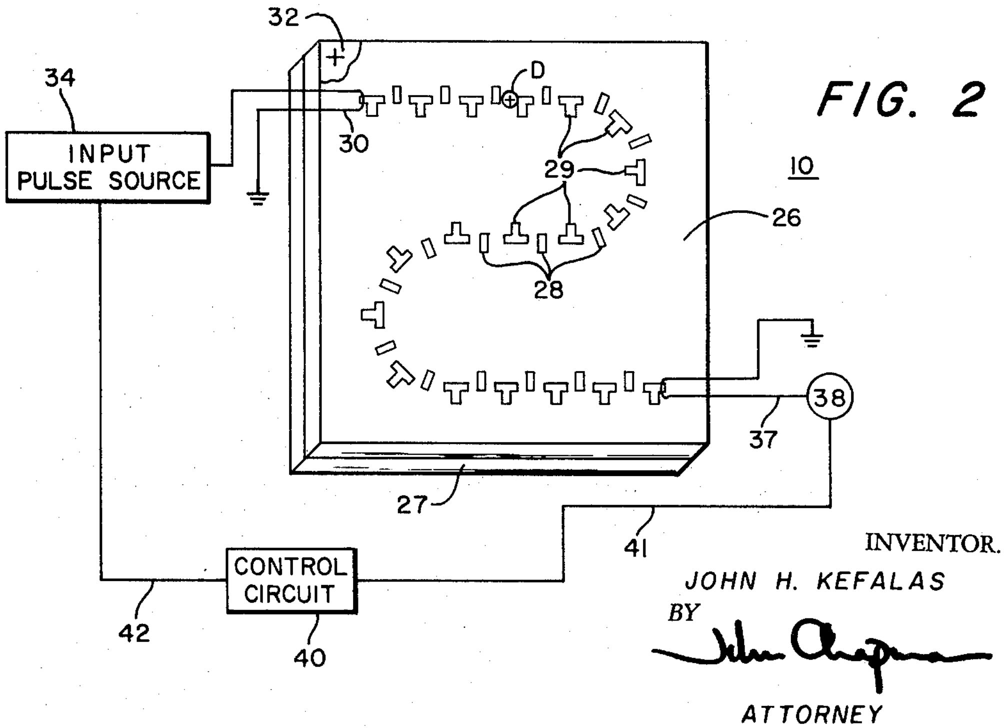
FIG. 2 is a schematic of one of the modules shown in FIG. 1 and embodies further features of the invention.

Each magnetic module 10, as shown in FIG. 2, comprises a magnetic layer 26 which is disposed over a substrate 27. The magnetic layer 26 is a cobalt-phosphorus alloy which is capable of supporting single wall domains which are magnetized in a direction perpendicular to the plane of the module 10. The substrate 27 is preferably a copper sheet. The cobalt-phosphorus alloy could be deposited upon substrate 27 by any one of a number of techniques known in the art. For example, an electroless deposition made with an orienting field so as to have the deposited layer exhibit perpendicular anisotropy would be suitable for practicing the present invention.

The magnetic module 10 as shown in FIG. 2 includes further a propagation channel which is defined in the magnetic layer 26 by bar and T-shaped magnetically soft overlays 28 and 29, respectively. The overlays 28 and 29 may be deposited upon the magnetic layer 26 by additive or subtractive techniques.

A representative conductor 30 is shown in FIG. 2 coupled to an input position in the layer 26 for the purpose of separating a single wall domain D from a source 32 of positive (+) magnetization as discussed in the Bobeck et al disclosure, U.S. Pat. No. 3,460,116, filed on Sept. 16, 1966. In this application, the magnetic layer 26 is assumed to be saturated in a downward direction and the source 32 and the single wall domains D are assumed to include flux directed upward. Conductor 30 is connected between an input pulse source 34 and ground.

A domain D propagates throughout the magnetic module 10 by following attracting pole concentrations which are moved along the magnetic overlays 28 and 29 in response to a rotating transverse magnetic field.

The rotating magnetic field is provided by the combination of fields which emanate simultaneously from coil portions **16*a* and 18*a* associated with a given magnetic module 10. A rotating transverse field may only be generated for a given magnetic module by selecting the current or pulse source 22 associated with its row location and the current or pulse source 24 associated with its respective column location. The simultaneous generation of signals from the selected sources 22 and 24 respectively in turn generate the desired combined field within the chosen magnetic module 10. The resulting field is rotated by pulse techniques as well as with sine wave signals in accordance with well understood principles. The filed may be generated, for example, by current signals applied to the pairs of coil portions 16*a* and 18*a*** by two sine wave generators 90° out of phase with one another. A device which employs and describes the operation of a rotating magnetic field in combination with overlays responsive to the magnetic field is described in U.S. Pat. No. 3,530,446 filed Sept. 12, 1968 by A. J. Perneski.

An output position in the magnetic layer 26 is coupled by a representative conductor 37 which is connected between a sense amplifier 38 and ground. Sense amplifier 38 is any one of a number of such circuits known in the art for the detection of the presence or absence of a current pulse or signal. Control circuit 40 is connected to sense amplifier 38 by means of conductor 41 and is further connected to the input pulse source 34 by means of conductor 42. Control circuit 40 provides for the clocking of the sensed output with the generation of domains. The rotating field, itself, could be employed as a clocking mechanism to measure against the sensed output in order to determine the presence or absence of pulses or the domains D which they represent in a given clock cycle. By coding the stream of pulses, an identification of the previous domain, locations can be made.

Since domain D may only be propagated within the selected magnetic module 10 in which is generated a rotating field, the remaining modules 10 in the modular array are only "half-selected" and therefore have no sensed output. Then, for the entire array of modules 10, only one sense amplifier 38 need be serially connected with each of the modules 10 in the array. FIG. 1 shows the employment of two sense amplifiers serially connected with respective portions of the array of magnetic modules 10. The effect of any shifting domains D in the "half-selected" modules may be avoided by maintaining sufficient spacing between the sense conductor 37 and the nearest stored domain D.

In order to serve as a suitable magnetic layer 26, the cobalt-phosphorus alloy cannot have a concentration of phosphorus greater than 10 percent by weight. Any concentration of phosphorus greater than 10 percent would demagnetize the cobalt by too great an extent. A concentration of phosphorus which best supports single wall domains is between 5 and 10 percent by weight. A plating bath composition which provides for a plated alloy having a concentration of 1 to 1.5 weight percent phosphorus and the balance cobalt is as follows:

| | Gms/l |
|---|---|
| Cobalt-sulfate · $7H_2O$ | 30 |
| Ammonium chloride | 50 |
| Sodium potassium tartrate | 50 |
| Sodium hypophosphite | 20 |

The pH of such plating solution is adjusted to 10 with ammonium hydroxide. The solution is operated at a temperature of 68°–70° C.

The weight per cent of phosphorus in the film can be controlled either by varying the hypophosphite ion concentration or changing the solution's pH. Generally, as the hypophosphite ion concentration increases the phosphorus content of the resulting magnetic layer 26 increases. Cobalt-phosphorus alloys having a phosphorus content of 2 percent or greater have preferred magnetic properties. Also, increasing the pH increases the phosphorus content of the alloy. The phosphorus content of the alloy can also be controlled by adjusting the temperature of the plating solution.

The significant advantage of using a cobalt-phosphorus material to support the single wall domains is that the magnetic plane may be fabricated with large dimensions and on a large scale at a low cost.

The additional advantage of modularization of the magnetic plane is that the time for accessing a given module 10 is reduced significantly from the accessing time of a monolithic memory plane having the same surface area as the modular array. Furthermore, since the rotating field is only generated in the selected module 10, he resulting inductance is less than that in driving the monolithic plane for data read-out. Therefore, the current sources 22 and 24 may be low cost devices as compared to those sources for the monolithic plane.

Obviously, many modifications of the present invention are possible in light of the above teaching. It is therefore to be understood that, in the scope of the appended claims, the invention may be practiced otherwise than as specifically described.

What is claimed is:

1. A modular memory array comprising:

magnetic planar modules arranged in columns and rows;

said modules capable of supporting cylindrical domains magnetized normal to the planar surfaces of said modules;

means for introducing said domains into said modules;

means for generating in said modules a rotating field transverse said domains, said generating means comprising a first set of coils, each of which surround a respective module of a given row;

said coils associated with any given row of modules being serially coupled with one another to form row-connected-coils;

a second set of coils, each of which surround a respective module of a given column;

said coils associated with any given column of modules being serially coupled with one another to form column-connected-coils;

first signal means coupled with each of said row-connected-coils; and second signal means coupled with each of said column-connected-coils;

means responsive to said transverse field for guiding said domains throughout their respective modules; and means for detecting the presence or absence of domains in predetermined locations within each of said modules.

2. A memory array in accordance with claim 1 wherein the coils of said first set are substantially orthogonal to the coils of said second set.

3. A memory array in accordance with claim 2 wherein said detecting means includes sensing means fewer in number than said modules.

4. An arrangement in accordance with claim 3 wherein said detecting means includes a single sensing means for detecting the presence or absence of domains in predetermined locations within each of said modules.

5. A memory array in accordance with claim 3 wherein said guiding means comprises an overlay of magnetically soft material in which moving pole concentrations are generated in response to said rotating field in order to attract and advance said domains.

6. A memory array in accordance with claim 5 wherein said modules comprise magnetic sheets of cobalt-phosphorus having a concentration of phosphorus no greater than 10 percent.

7. A memory array in accordance with claim 6 wherein said modules comprise magnetic sheets of cobalt-phosphorus having a concentration of phosphorus between 5–10 percent.

8. A domain propagation arrangement comprising a planar sheet of cobalt-phosphorus capable of supporting cylindrical domains which are magnetized normal to the planar surfaces of said sheet, means for introducing cylindrical domains into said sheet, means for propagating said domains throughout said sheet, and means for detecting the presence or absence of domains in predetermined locations within each of said modules.

9. An arrangement in accordance with claim 8 wherein said planar sheet has a concentration of phosphorus no greater than 10%.

10. An arrangement in accordance with claim 9 wherein said concentration of phosphorus is between 5–10 percent.

11. An arrangement in accordance with claim 10 wherein said propagating means includes means for generating in said sheet a field transverse said domains, and means responsive to said transverse field for guiding said domains throughout said sheet, said guiding means comprising an overlay of magnetically soft material in which moving pole concentrations are generated in response to said rotating field in order to attract and advance said domains. .

12. A method of reading information from a matrix of magnetic modules arranged in columns and rows, each supporting a plurality of cylindrical domains magnetized normal to the surfaces of said modules, comprising the steps of selecting a row of magnetic modules;

providing a first magnetic field within the modules of said row substantially transverse said domains;

selecting a column of magnetic modules;

providing a second magnetic field within the modules of said column substantially transverse said domains and the direction of said first field such that a single module is selected by being subject to a combined field of said first and second fields which propagates said domains throughout said selected module; and detecting said propagated domains at predetermined locations within said selected module.

* * * * *